US009568246B2

(12) United States Patent
Piret

(10) Patent No.: US 9,568,246 B2
(45) Date of Patent: Feb. 14, 2017

(54) RAMMING MASS FOR THE REFRACTORY LINING OF A METALLURGICAL VESSEL, METHOD FOR THE PLACEMENT THEREOF AND METALLURGICAL VESSEL, IN PARTICULAR BLAST FURNACE, COMPRISING A LINING USING SAID RAMMING MASS

(75) Inventor: Jacques Piret, Liège (BE)

(73) Assignee: PAUL WURTH S.A., Luxembourg (LU)

( * ) Notice: Subject to any disclaimer, the term of this patent is extended or adjusted under 35 U.S.C. 154(b) by 333 days.

(21) Appl. No.: 14/343,891

(22) PCT Filed: Sep. 5, 2012

(86) PCT No.: PCT/EP2012/067344
§ 371 (c)(1),
(2), (4) Date: Mar. 10, 2014

(87) PCT Pub. No.: WO2013/034605
PCT Pub. Date: Mar. 14, 2013

(65) Prior Publication Data
US 2014/0217655 A1      Aug. 7, 2014

(30) Foreign Application Priority Data
Sep. 9, 2011   (LU) .......................................... 91868

(51) Int. Cl.
*F27D 1/00*      (2006.01)
*C04B 35/66*    (2006.01)
(Continued)

(52) U.S. Cl.
CPC ........... *F27D 1/0006* (2013.01); *C04B 35/532* (2013.01); *C04B 35/6269* (2013.01);
(Continued)

(58) Field of Classification Search
CPC ........ C21B 7/06; F27D 1/0006; F27D 1/0009; F27D 1/10; F27D 1/145
See application file for complete search history.

(56) References Cited

U.S. PATENT DOCUMENTS 4,272,062 A * 6/1981 Fuziwara ................ C04B 35/52
                                                              264/30

FOREIGN PATENT DOCUMENTS

| CN | 1544389 | 11/2004 |
| CN | 1690012 | 11/2005 |

(Continued)

OTHER PUBLICATIONS

International Search Report for corresponding application PCT/EP2012/067344 filed Sep. 5, 2012; Mail date Mar. 9, 2014.

(Continued)

*Primary Examiner* — Lois Zheng
(74) *Attorney, Agent, or Firm* — Cantor Colburn LLP

(57) ABSTRACT

A ramming mass for the block lining of at least some of the refractory elements of a refractory lining of a metallurgical vessel such as a blast furnace, said ramming mass being composed of a mixture of a granular phase and a binder phase, wherein the granular phase and/or binder comprises at least one component having a microporous structure or capable of forming a microporous structure by firing during the blast furnace campaign. The ramming mass is in particular intended for forming the joint between two concentric annular assemblies forming a side wall of the vessel or between a lower part of an inner annular assembly and the periphery of one or more refractory layers forming the floor of the vessel.

17 Claims, 1 Drawing Sheet

(51) Int. Cl.
*C21B 7/06* (2006.01)
*C04B 35/532* (2006.01)
*C04B 35/626* (2006.01)
*C04B 35/63* (2006.01)
*C04B 37/00* (2006.01)
*F27B 1/14* (2006.01)
*F27D 1/10* (2006.01)
*C21C 5/44* (2006.01)

(52) U.S. Cl.
CPC .......... *C04B 35/6303* (2013.01); *C04B 35/66* (2013.01); *C04B 37/005* (2013.01); *C21B 7/06* (2013.01); *F27B 1/14* (2013.01); *F27D 1/10* (2013.01); *C04B 2235/3232* (2013.01); *C04B 2235/3843* (2013.01); *C04B 2235/425* (2013.01); *C04B 2235/428* (2013.01); *C04B 2235/5276* (2013.01); *C04B 2237/086* (2013.01); *C04B 2237/32* (2013.01); *C04B 2237/78* (2013.01); *C21C 2005/446* (2013.01)

(56) References Cited

FOREIGN PATENT DOCUMENTS

| | | |
|---|---|---|
| CN | 101823891 | 9/2010 |
| EP | 0500061 | 8/1992 |
| FR | 2444716 | 7/1980 |
| JP | 2002121080 | 4/2002 |
| LU | 48404 A | 6/1965 |

OTHER PUBLICATIONS

International Preliminary Report on Patentability for corresponding application PCT/EP2012/067344 filed Sep. 5, 2012; Mail date Mar. 20, 2014.

\* cited by examiner

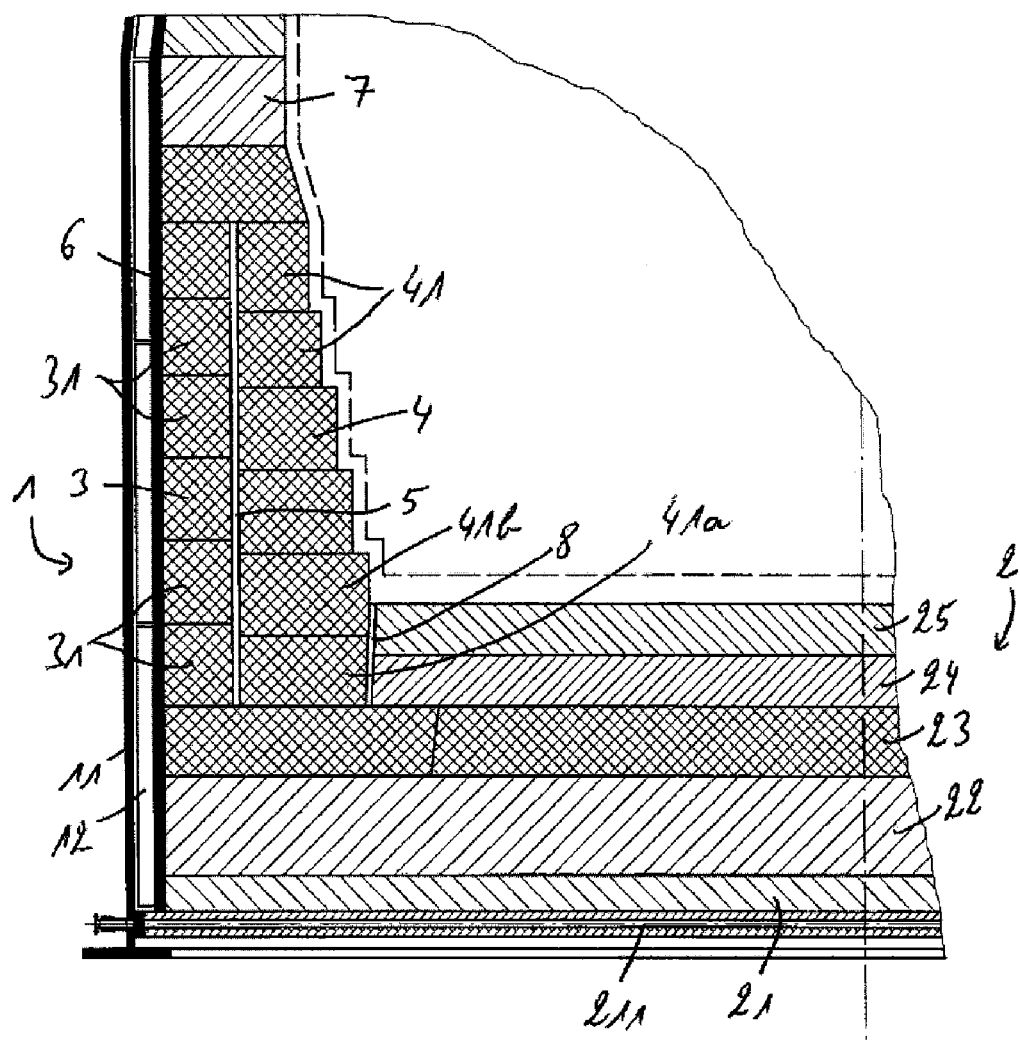

RAMMING MASS FOR THE REFRACTORY LINING OF A METALLURGICAL VESSEL, METHOD FOR THE PLACEMENT THEREOF AND METALLURGICAL VESSEL, IN PARTICULAR BLAST FURNACE, COMPRISING A LINING USING SAID RAMMING MASS

FIELD OF THE INVENTION

The present invention relates in general to the internal refractory lining of a metallurgical vessel, such as in particular the stack of a blast furnace, and more particularly the lower part of this stack or hearth. It relates more particularly to a ramming mass for producing joints between the carbon blocks making up said lining and the hearth floor, together with the joints between these blocks.

BACKGROUND OF THE INVENTION

In the specific case of blast furnaces, the internal refractory lining is conventionally made up of an assemblage of a plurality of refractory elements, in the form of blocks or bricks, of identical or different sizes and shapes depending on the location of each block or brick. The material of which these refractory elements are composed also depends on where they are located in the stack. Accordingly, the hearth floor, or bottom, is commonly fitted with a plurality of superposed layers of elements, for example two or three layers of carbon blocks surmounted by two layers of ceramic elements, the upper layer forming the hearth floor which is in contact with the molten iron. The refractory lining of the side walls of the hearth is itself also usually formed from a superposed arrangement of a plurality of annular refractory layers. In the lower part, each layer may comprise an outer annular part, located closest to the metal wall of the stack, and an inner annular part, which forms the side wall of the hearth in contact with the molten iron, or closest thereto. Each annular part is formed of a plurality of circumferentially juxtaposed blocks and the material of the various blocks is adjusted to its location in the various layers and rings. Furthermore, elements of a specific shape and material are used at the level of the tapholes and also, higher up, at the level of the tuyeres.

The ramming masses are used in constructing the internal refractory lining of the stack for filling the gaps between the refractory elements, which are blocks or bricks, typically made of carbon or ceramic, and the walls or other metal elements forming the blast furnace stack, as well as for filling the gaps between adjacent refractory elements or between different layers or courses of such elements, and in particular between certain refractory elements of the bottom and certain other elements of the side walls of the hearth.

Depending on their location, there will thus be "cold" joints between the blocks of the outer rings and the cooling panels, and hot joints between the blocks of an inner ring and those of an outer ring.

The distance between an inner ring and an outer ring may be substantially constant, for example of the order of 50 mm, with a precision of a few mm as a result of the good dimensional tolerance of the blocks.

In contrast, due to the geometric irregularities of the stack, in particular the imperfect circularity thereof resulting from the much larger tolerances of the cooling panels of the stack wall, the distance between the blocks of an outer ring and the cooled stack walls may vary substantially around the circumference, the thickness of the joint to be produced typically being 80 mm, ±20 mm.

Moreover, account must be taken of the elevated temperature differential, which prevails in service, between the internal wall of the hearth and the external face of the lining, located close to the metal wall of the stack, and of the variation in this temperature differential over the various operating phases, in particular during start-up. This is because when the lining blocks are initially laid they are all at low temperature, whether they are located towards the inside of the hearth or towards the stack wall, whereas when the blast furnace is in operation the outermost blocks remain relatively cold, while those in contact with the molten iron are heated to very high temperatures. Some variation in the gaps between the blocks must therefore be allowed, in particular in the radial direction, between the blocks of two concentric rings, in order to offset the significant differentials in expansion when, in particular during commissioning, the inner layer of the lining heats up much faster than the outer layer. It is therefore highly advantageous for the joint between two rings to be compressible. By way of example, the compressibility of the joints between these two layers may amount to 15 to 20%.

At the level of the joints between the inner rings of the wall and the upper layers of the bottom, the gap may also be quite irregularly shaped, in particular due to the shape of the bottom blocks or bricks which are arranged in accordance with a plan, but possibly being assembled in this plan in parallel lines, whereas the blocks of the ring are arranged in a circle. Apart from the significant dimensional variations in these joints, which may also be known as hot joints, the joints are furthermore created between blocks which may be made of different materials, for example carbon for the ring blocks and ceramic for the bottom, which results in different behaviour in the event of any temperature fluctuations, in particular during the start-up phase of the blast furnace.

It is therefore necessary to use ramming mass to compensate any irregularities which may leave gaps between adjacent blocks, the mass therefore acting to fill the irregular and/or variable gaps between the blocks. The ramming mass also has the function of ensuring satisfactory thermal transfer from the hot internal face of the lining towards its cooled external face, and of at least not disrupting the thermal transfer which takes place through the refractory elements. The ramming mass also, importantly, has the function of providing a compressible body, in the manner of a plastically compressible joint capable of absorbing and reducing the thermomechanical stresses which may develop between refractory elements, in particular due to temperature fluctuations, especially between the bricks of the bottom and the inner layer of blocks of the side lining, as well as between said inner layer and the outer layer of this lining.

Known ramming masses are commonly composed of a mixture of a granular phase composed of calcined anthracite or electrographite, or a mixture of these, with the possible addition of SiC, and a binder generally of the tar or resin type, with the aim of providing the above-stated compressibility.

Various ramming mass compositions are already known for example from JP 2002121080, CN 1544389, CN1690012 or CN101823891.

One general problem with ramming masses is that they are generally placed by manual compaction, possibly assisted by compacting machines, but they are always less homogeneous and less compact than the refractory blocks or bricks manufactured by sophisticated pressing or extrusion methods. Since the granular phase is furthermore essentially based on standard carbon or graphite, the erosion and/or corrosion resistance of the joints formed by these ramming masses when exposed to molten metal and aggressive agents such as alkalis, steam etc. is much lower than that of the prefabricated refractory elements.

Furthermore, the commonly used tar type binder may remain relatively flexible up to a temperature of the order of 500° C., but at higher temperatures, for example from approximately 800° C., it polymerises and forms a very strong bond between the granules of the ramming mass, so destroying its relative flexibility. Accordingly, prior art ramming masses comprising a binder of this type may be used at the level of "cold" joints, since in this case the relatively low temperature makes it possible to preserve the required compressibility of the joint, particularly between the outer rings, or outer refractory layers, and the cooled metal walls of the stack. In contrast, at the level of the above-mentioned hot joints, hardening of the joint leads, above a temperature of the order of 500° C., to a loss of compressibility. This hardening of the joint may also lead, in particular at the level of the joints between the bottom and side wall, to an increased risk of infiltration due to cracking of the joints.

BRIEF SUMMARY OF THE INVENTION

The invention seeks to improve the durability of the joints formed by the ramming mass, in particular for "hot" joints, such as those produced between the bottom lining and the blocks of the side lining, or alternatively between the blocks of an inner ring and those located opposite thereto on the outer ring. The invention further improves heat transfer, for example between such blocks.

More particularly, the invention involves using a ramming mass for the block lining of at least some of the refractory elements of a refractory lining of a metallurgical vessel such as a blast furnace, said ramming mass being composed of a mixture of a granular phase and a binder phase, wherein the granular phase and/or the binder comprises at least one component having a microporous structure or capable of forming a microporous structure by firing during the blast furnace campaign.

The ramming mass according to the invention thus has the advantage of creating in the metallurgical vessel joints between blocks or bricks which have better resistance to attack by molten metal and other aggressive agents capable of acting physically or chemically on these joints. This improvement arises from the microporous structure of the joints, which avoids or at least greatly limits infiltration by metal or other aggressive agents via the joints, so avoiding a corresponding attack of the blocks starting from damaged joint zones. In this respect, it is worth noting the beneficial effect of using, on the one hand, a microporous granular phase and, on the other, a binder capable of forming such a microporous structure, while retaining good compressibility at least during the initial heating periods, as will be seen below.

It will be noted that, in the context of the invention (and in particular contrary to the definition provided by IUPAC), a microporous structure is taken to mean a structure, the pores of which have an average size of less than 2 μm. The microporous materials mentioned for the present invention will therefore be taken to mean those having an average pore size of 2 μm or less, and preferably of 1 μm or less.

According to a first particular development, the granular phase essentially comprises carbon or carbon-based granules having a microporous structure. Such a structure in itself already provides an appreciable improvement over prior art granular materials due to the reduction in pores sizes, so making it possible, as indicated previously, to provide better resistance to attack by the molten metal and to other aggressive agents capable of acting physically or chemically on these joints. Furthermore, it also makes it possible, in a similar manner to blocks with a microporous structure, to provide more efficient transmission of thermal flux, so limiting heating of the surface layer, and thus contributing to maintaining a layer of colder metal in contact with said surface of the lining, this layer of colder metal also having a protective action on the refractory wall.

In a first variant, the ramming mass may be formed of this microporous granular phase and of a binder based on tar or polymerising resin.

According to one particularly advantageous development, the binder phase comprises at least one tar-type component, which is furthermore capable of developing a microporous structure on firing at high temperature which occurs during the increase in temperature after placement of the ramming mass when the blast furnace is returned to service. Thus, at the beginning of a blast furnace operating campaign, before the joints have hardened under the action of the above-mentioned elevated temperatures, the compressibility of the binder serves in known manner to permit the relaxation of the thermomechanical stresses generated by the differential heating of the materials in the refractory lining assembly. Subsequently, on firing of the joints by exposure to the high temperatures, typically of more than 800° C., not only does the known hardening due to polymerisation occur but also the formation, specific to the invention, of a microporous structure.

According to another alternative development, the binder phase comprises at least one component of the polymerising resin type, which is likewise capable of developing a microporous structure on firing at high temperature which occurs during the increase in temperature after placement of the ramming mass when the blast furnace is returned to service. Thus, at the beginning of a blast furnace operating campaign, before the joints have hardened by exposure to elevated temperatures, the compressibility of the binder serves in known manner to permit the relaxation of the thermomechanical stresses generated by the differential heating of the materials in the refractory lining assembly. Subsequently, once the joints have been fired by exposure to said high temperatures, the known hardening due to polymerisation occurs as does, at a certain point, in particular beyond 800° C., the formation, specific to the invention, of a microporous structure.

This microporous structure is the result of adding to the binder an additive which is capable of making it microporous on firing, such as a metallic silicon powder, the effect of which is to create, with the carbon from the tar or the resin or the carbon fibres, SiC whiskers on firing. By way of reminder, it will be recalled that "whiskers" are elongate articles of a small diameter virtually completely lacking crystal defects, which provides them with very high mechanical strength. These whiskers, by extending across the pores of the hardened tarry or polymerised resin, give rise to the microporosity providing very robust obstacles which prevent the penetration of liquid metal or other aggressive agents.

According to another particular development, the microporous material granular phase may be obtained by grinding microporous refractory blocks, waste from cutting microporous refractory blocks, or used microporous carbon blocks recovered from a previous refractory lining.

According to still another development, the binder matrix phase may comprise fine graphite granules which, by improving lubrication of the ramming mass itself, imparts better compacting properties thereto.

Likewise, this matrix phase may comprise agents which protect against erosion by liquid iron, such as for example TiC or TiO2, which have the ability increase the viscosity of the iron which comes into contact with the resultant joints, so providing still better protection against penetration of iron into the joint material.

The invention also consists in a method for producing hot joints between the refractory elements of a refractory lining of a metallurgical vessel such as a blast furnace, according to which a ramming mass composed of a mixture of a granular phase and a binder phase is used, wherein the binder comprises at least one component based on tar or polymerising resin, and an additive, such as metallic silicon powder, capable of making the binder microporous by the firing resulting from the increase in temperature of the metallurgical vessel, after placement of the ramming mass.

This method will in particular be used for producing joints between two concentric annular assemblies forming a side wall of the vessel, and defining therebetween an annular gap filled by said joints, as well as for producing joints between a lower part of an inner annular assembly making up a side wall of the vessel and the periphery of one or more refractory layers forming the floor of the vessel.

The invention further provides a metallurgical vessel, such as a blast furnace, comprising a refractory lining formed of an assemblage of a plurality of assemblies of refractory blocks or bricks which, between at least some of these blocks or bricks or assemblies of blocks or bricks, define gaps filled by a joint, wherein the joints are formed on the basis of a ramming mass as previously defined. Such a joint may be formed between two concentric annular assemblies forming a side wall of the hearth, and defining therebetween an annular gap filled by said joint. If need be, the side wall could also comprise more than two concentric annular assemblies, the joint being formed at each interface between said annular assemblies. Such a joint may also be formed between a lower part of an inner annular assembly and the periphery of one or more refractory layers forming the floor of the vessel.

BRIEF DESCRIPTION OF THE DRAWINGS

Other distinctive features and characteristics of the invention will be revealed by the additional description given below by way of example of a use of the ramming mass according to the invention for producing the refractory lining of the blast furnace stack.

Reference will be made to the appended drawing, the single FIGURE of which shows a section in a radial plane of the lining zone in the vicinity of the junction between the side lining and the bottom of a blast furnace.

DETAILED DESCRIPTION

The stack 1 of the blast furnace shown only in part on the FIGURE comprises, in known manner, a metal wall 11 provided with cooling panels 12. The floor 2 comprises a plurality of superposed layers of refractory material, for example, starting from the bottom, a first layer 21 of graphite blocks located above the cooling tubes 211 through which a cooling liquid passes, a second layer 22 also formed of standard carbon blocks, a third layer 23 which may be formed of super-microporous carbon blocks with very high thermal conductivity, and two layers 24, 25 of ceramic bricks. Beneath the first layer 21 of blocks, the cooling tubes may be embedded in a carbon ramming mass.

Starting from the level of the fourth layer 24, the refractory side wall is made up of two concentric annular assemblies 3, 4, each being formed of a stack of superposed rings 31, 41, each ring being made up of circumferentially arranged microporous carbon blocks with very high thermal conductivity. An annular gap, of a radial thickness of the order of 60 mm, is provided between the outer annular assembly which is located closest to the cooled stack walls and the inner annular assembly, and is filled by a joint 5 produced from a ramming mass according to the invention. The gaps between the periphery of the first layers of the bottom and the outer annular assembly, on the one hand, and the wall cooled by the cooling panels, on the other hand, are filled by a ramming mass 6 which may be of the conventional kind, not being exposed to very high temperatures.

The concentric annular assemblies 3 and 4 extend upwards to the upper level of the hearth, the refractory lining continuing upwards therebeyond with annular assemblies 7 of standard carbon blocks.

Between the first layers 41a, 41b of inner rings and the ceramic floor layers 24, 25 of the bottom there is a peripheral joint 8 produced with the ramming mass according to the invention, to compensate the deviations between the geometry of the periphery of the bottom and the circular shape of the internal surface of the first inner rings. This zone is particularly problematic because it is right in the angle between the horizontal bottom and the vertical walls of the hearth and is therefore particularly hot, and furthermore this annular junction zone between the bottom and the side wall extends vertically and is therefore particularly susceptible to infiltration by molten iron. The ramming mass joint 8 formed at this level may furthermore exhibit substantial variations in thickness, in the radial direction, which also impairs the uniformity of thermal characteristics. The ramming mass according to the invention is particularly well justified at this level thanks to its favourable characteristics in terms of thermomechanical resistance, of providing a barrier against penetration by iron and of being compressible during the phase of increasing temperature in the furnace, in order to minimise mechanical stresses on neighbouring blocks and so subsequently to ensure the greatest possible absence of leaks.

At level of the joints 5 between the two concentric annular assemblies, it is the thermal conductivity and compressibility characteristics of the ramming mass according to the invention which are of particular relevance. As has already been stated, said compressibility makes it possible to limit the thermomechanical stresses between the two assemblies 3 and 4 when the inner assembly is directly exposed to the heat of the molten metal while the outer assembly remains cold. The thermal conductivity ensures optimum thermal transfer from the inside towards the outside of the refractory lining, so limiting heating of the blocks of the inner rings.

Thus, in conjunction with the use of high performance carbon and ceramic blocks, placement of the ramming mass according to the invention makes it possible to ensure good uniformity of the thermomechanical characteristics of the refractory lining at the level of each isothermal profile in the thickness of the lining for a longer period than with a prior art ramming mass, while ensuring the best possible match between joint characteristics and local stresses, in order as far as possible to minimise the negative effect of the structural non-uniformities in the refractory lining at the level of said joints.

The invention claimed is:

1. A ramming mass for producing hot joints when block lining refractory elements of a refractory lining of a metallurgical vessel, the ramming mass comprising:
a granular phase comprising carbon or carbon-based granules having a microporous structure;
a binder comprising at least one component based on tar or polymerising resin, and an additive composed of metallic silicon powder, the binder capable of developing a microporous structure having an average pore size of 2 µm or less on firing at high temperature, by forming SiC whiskers which develop across pores of hardened tarry or polymerised material.

2. The ramming mass according to claim 1, wherein the binder comprises fine graphite granules.

3. The ramming mass according to claim 1, wherein the binder comprises agents which protect against erosion by liquid iron.

4. The ramming mass according to claim 1, wherein the granular phase comprises carbon or carbon-based granules having a microporous structure having an average pore size of 2 µm or less.

5. The ramming mass according to claim 4, wherein the granular phase is obtained by grinding microporous refractory blocks, waste from cutting microporous refractory blocks or used microporous carbon blocks.

6. A method for producing hot joints between refractory elements of a refractory lining of a metallurgical vessel, the method comprising: placing a ramming mass, as defined in claim 1, into the joints; and making the binder microporous by firing resulting from an increase in temperature of the metallurgical vessel, after placement of the ramming mass.

7. A method according to claim 6, wherein said joints are located between two concentric annular assemblies forming a side wall of the vessel and defining therebetween an annular gap filled by said joints.

8. A method according to claim 6, wherein said joints are located between a lower part of an inner annular assembly making a side wall of the vessel and a periphery of one or more refractory layers forming the floor of the vessel.

9. A metallurgical vessel comprising: a refractory lining formed by an assemblage of a plurality of assemblies of refractory blocks or bricks which, between at least some of these blocks or bricks or assemblies of blocks or bricks, define gaps filled by a joint, wherein the joints are formed on the basis of a ramming mass as defined in claim 1.

10. A metallurgical vessel according to claim 9, wherein the joint is formed between two concentric annular assemblies forming a side wall of the vessel, and defining therebetween an annular gap filled by said joint.

11. A metallurgical vessel according to claim 9, wherein the joint is formed between a lower part of an inner annular assembly making a side wall of the vessel and a periphery of one or more refractory layers forming the floor of the vessel.

12. A metallurgical vessel according to claim 9, wherein the vessel comprises a blast furnace.

13. The ramming mass according to claim 3, wherein the agents comprising at least one of TiC and $TiO_2$.

14. A metallurgical vessel comprising:
a refractory lining formed by an assemblage of a plurality of assemblies of refractory blocks or bricks which, between at least some of these blocks or bricks or assemblies of blocks or bricks, define gaps filled by a joint,
wherein the joints are formed by the method according to claim 6.

15. A metallurgical vessel according to claim 14, wherein the joint is formed between two concentric annular assemblies forming a side wall of the vessel, and defining therebetween an annular gap filled by said joint.

16. A metallurgical vessel according to claim 14, wherein the joint is formed between a lower part of an inner annular assembly making a side wall of the vessel and a periphery of one or more refractory layers forming the floor of the vessel.

17. A metallurgical vessel according to claim 14, wherein the vessel comprises a blast furnace.

* * * * *